US012572540B2

(12) United States Patent
Jain et al.

(10) Patent No.: US 12,572,540 B2
(45) Date of Patent: Mar. 10, 2026

(54) ACCELERATED DATABASE QUERY PROCESSING WITH COMPLIED CODE REUSE

(71) Applicant: Singlestore, Inc., San Francisco, CA (US)

(72) Inventors: Saksham Jain, San Francisco, CA (US); John Sherwood, San Francisco, CA (US); Zhou Sun, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 0 days.

(21) Appl. No.: 18/746,409

(22) Filed: Jun. 18, 2024

(65) Prior Publication Data

US 2024/0338365 A1     Oct. 10, 2024

Related U.S. Application Data

(63) Continuation of application No. 17/558,348, filed on Dec. 21, 2021, now Pat. No. 12,045,234.

(51) Int. Cl.
*G06F 16/2453*          (2019.01)
(52) U.S. Cl.
CPC .. *G06F 16/24542* (2019.01); *G06F 16/24549* (2019.01)
(58) Field of Classification Search
None
See application file for complete search history.

(56) References Cited

U.S. PATENT DOCUMENTS

| | | | |
|---|---|---|---|
| 9,934,051 B1 * | 4/2018 | Ding | G06F 9/4552 |
| 12,086,574 B1 * | 9/2024 | Vanderschaegen | G06F 8/427 |
| 2016/0182409 A1 * | 6/2016 | Kraemer | H04L 25/20 370/417 |
| 2018/0260437 A1 * | 9/2018 | Paroski | G06F 8/447 |
| 2021/0133192 A1 * | 5/2021 | Sun | G06F 9/45504 |
| 2021/0133193 A1 * | 5/2021 | McConnell | G06F 16/2453 |
| 2022/0107812 A1 * | 4/2022 | Foley | G06F 9/3889 |
| 2023/0014435 A1 * | 1/2023 | Shanker | G06F 16/2282 |
| 2023/0128127 A1 * | 4/2023 | Hristodorescu | G06F 8/45 712/220 |

OTHER PUBLICATIONS

Xu et al: Copy-and-Patch Compilation, Nov. 26, 2020.
Thomas Neumann: Efficiently Compiling Efficient Query Plans for Modern Hardware; Proceedings of the VLDB Endowment vol. 4 Issue Jun. 9, 2011 pp. 539-550.

(Continued)

*Primary Examiner* — Christopher J Raab
(74) *Attorney, Agent, or Firm* — EIP US LLP

(57)          ABSTRACT

In an example there is provided a computer-implemented method which comprises generating an execution plan for a received user query, converting the execution plan into bytecode, compiling to unoptimized machine code using the bytecode and beginning execution of the execution plan by executing the unoptimized machine code, compiling optimized machine code using the bytecode whilst executing the unoptimized machine code; and switching to executing the optimized machine code in order to execute the execution plan, when the optimized machine code has been compiled.

17 Claims, 6 Drawing Sheets

(56)　　　　　References Cited

OTHER PUBLICATIONS

AsmJit Project: https://asmjit.com, copyright 2018-2021, access Dec. 21, 2021.

LLVM Compiler Infrastructure website, LLVM's Analysis and Transform Passes: https://llvm.org/docs/Passes.html, accessed Dec. 21, 2021.

The LLVM Compiler Infrastructure: https://llvm.org/, accessed Dec. 21, 2021.

* cited by examiner

300

310

Unoptimized machine code

Function X:

```
        nop
        mov %reg1, y
        mov %reg2, z
        ...
        ret
```

Main:

```
        nop
        call Function X
        ...
        ret
```

320

Unoptimized machine code – after optimized machine code compiled

Function X:

```
        jmp <address of optimized machine code Function X>
        mov %reg1, y
        mov %reg2, z
        ...
        ret
```

Main:

```
        jmp <address of optimized machine code Main>
        call Function X
        ...
        ret
```

ACCELERATED DATABASE QUERY PROCESSING WITH COMPLIED CODE REUSE

CROSS-REFERENCE TO RELATED APPLICATIONS

This application is a continuation under 35 U.S.C. § 120 of U.S. application Ser. No. 17/558,348, filed Dec. 21, 2021. The above-referenced patent application is hereby incorporated by reference in its entirety.

BACKGROUND

Technical Field

The present application relates to processing and executing user search queries in relation to data in databases.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to submit a "query" or call one or more functions in a query language for searching, organizing, retrieving and/or manipulating information that satisfies particular function parameters.

In a typical database management system, a user query comprises one or more structured query language (SQL) statements which are parsed and converted into an execution plan by an optimizer. The execution plan is then compiled into code for execution in order to process the query and return an answer. The execution plan may be compiled into a runtime operator tree, or byte code, or a combination of the two, which is then interpreted by an interpreter. Alternatively, the execution plan can be compiled directly into machine or assembly code and executed.

BRIEF DESCRIPTION OF THE DRAWINGS

Various features of the present disclosure will be apparent from the detailed description which follows, taken in conjunction with the accompanying drawings, which together illustrate, features of the present disclosure, and wherein:

FIG. 3 is pseudo-code illustrating updating of machine code according to an example.

DETAILED DESCRIPTION OF CERTAIN EMBODIMENTS

Figure 1:
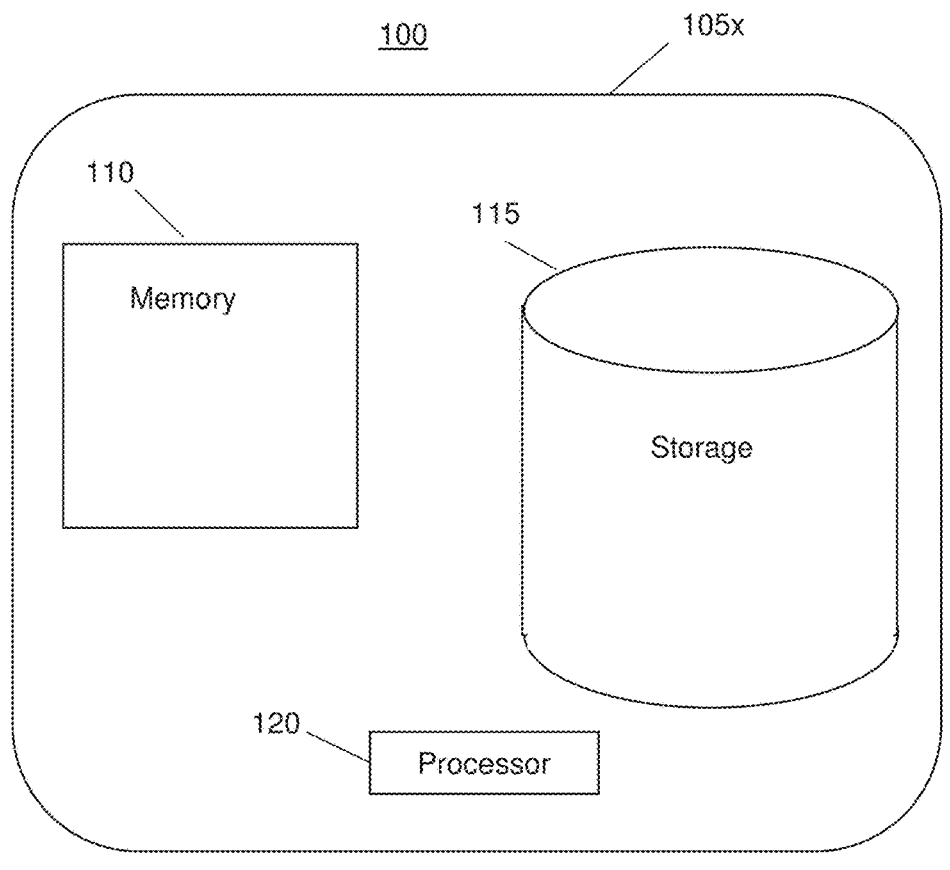
FIG. 1 is a schematic diagram of a database management system according to an example.
Figure 1:
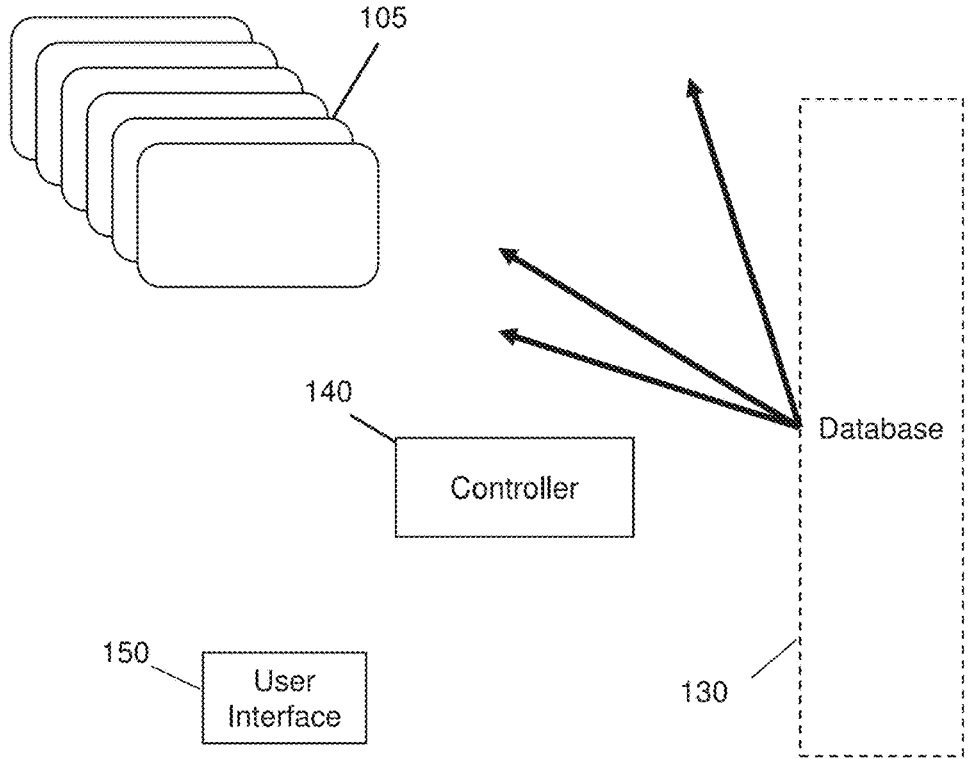

FIG. 1 shows a database management system 100 for managing a database 130 including processing user queries relating to data stored in the database. The database 130 may be distributed onto a number of nodes 105, 105x as part of a database cluster. The database 130 may be distributed in any suitable fashion, such as horizontally sharded using a shard key. Alternatively, the database 130 may be implemented on a single node.

Some details for a representative node 105x are shown and may comprise volatile memory 110 such as RAM, storage 115 such as disk, and a processor 120. The database or database shard may be stored in one or both of the volatile memory 110 and the storage 115, and may be stored in any suitable format such as in column store and/or row store. For example, the database or database shard may be stored in disk-based column store data and in-memory row store data backed by snapshots on the storage 115. The volatile memory 110 may be used for temporarily holding and manipulating data from the database and may include a buffer cache where parts of the column store data from the disk are cached and a query execution memory for holding temporary hash tables, sort runs, and other data used during processing of the user query. Modified data from the buffer cache may subsequently be used to update data stored in the storage 115. The non-volatile memory may store computer programs used to control the cache and database elements stored in the memory 110 and storage 115. The non-volatile memory may also store query plans permanently or for long periods spanning restarts. The non-volatile memory may comprise a code base for storing compiled functions which may be reused for later user queries.

The processor 120 is used to load and execute programs stored from the storage 115, to generate query plans for user queries and to execute those query plans, and to control input/output (IO) operations associated with the storage 115.

The database management system 100 also comprises a user interface 150 which may include a monitor, keyboard and mouse or other components in order to allow a user to enter user queries and to receive answers to these queries. The user queries may be entered as SQL statements and the answers may be data from the database arranged into a new table for example. The user interface may be implemented by one of the database holding nodes 105 or by a different node.

The database management system 100 may also include a controller 140 which may be used to control how the database is distributed and to allocate execution tasks of the database management system 100 to different nodes 105, for example to enable load balancing. The controller 140 may be implemented by one of the database holding nodes 105 or by a different node.

Figure 2:
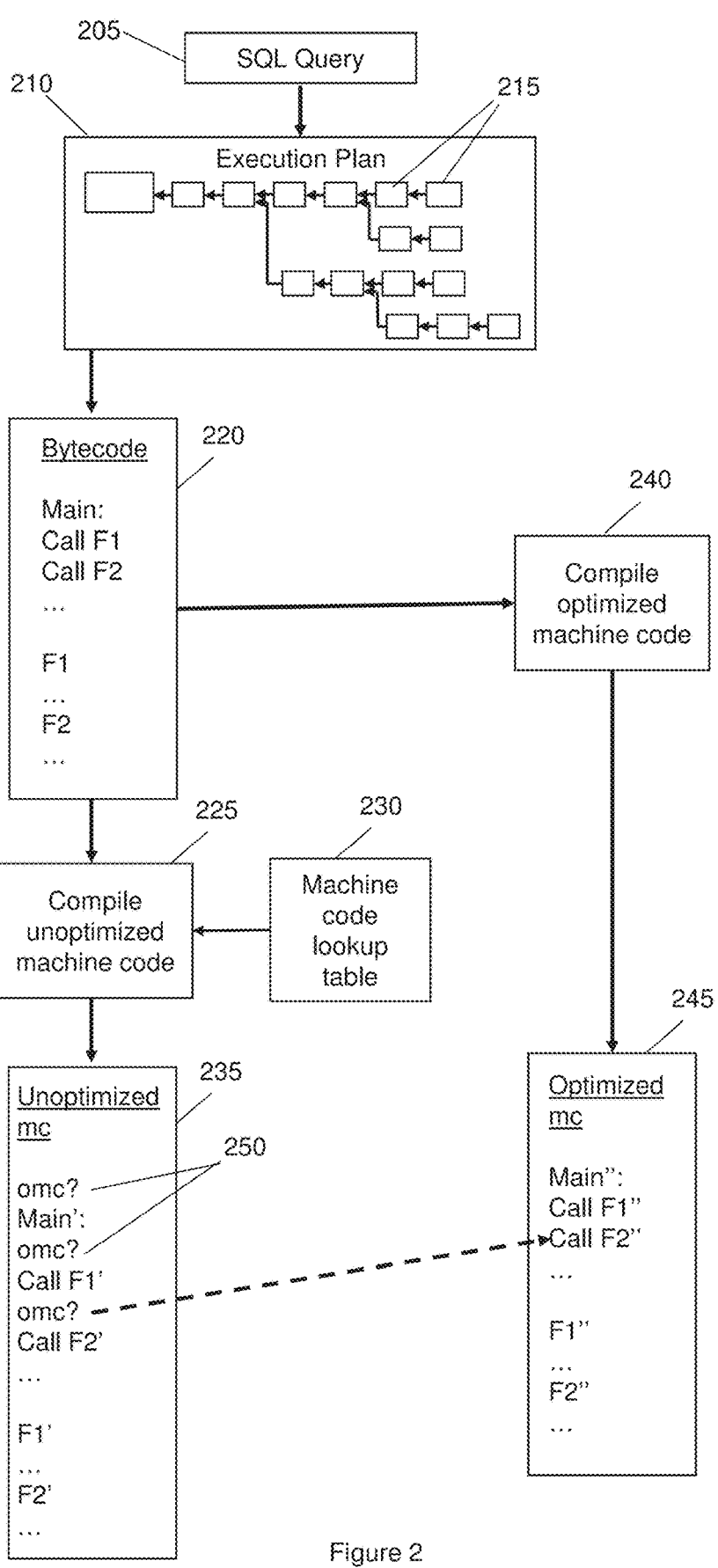
FIG. 2 is a schematic diagram illustrating processing of a user query according to an example.

FIG. 2 illustrates processing and executing an SQL user query according to an example. The SQL query 205 is parsed and optimized in order to generate an execution plan 210. This may be implemented by a query engine which includes a parsing function including syntax check, semantic check and a shared pool check for reusing parts of a previously generated execution plan if appropriate. The syntax check ensures that the format of the SQL statement meets the SQL language rules. The semantic check determines the meaning of each statement including required operations and specified data resources from the database. The shared pool check determines whether the intended set of operations on the specified data has already been processed into an executable format, in which case this executable format can be reused rather than processed again. An optimization process generates multiple execution plans capable of carrying out the required operations and determines which of these plans has a lowest cost. The lowest cost plan corresponds to the optimal execution plan 210 to be executed. The execution plan comprises a number of operators 215 arranged in sequential and parallel orders for execution. Example operators include TABLESCAN, MERGE JOIN, COMPUTE SCALAR, CLUSTERED INDEX SCAN, SORT and many others.

The execution plan may be converted into byte code, such as that produced from Java source code for submission to the Java runtime, where each operator is compiled into a block of byte code which is called and interpreted by an interpreter in order to execute the execution plan. Various other byte-codes may be used such as memSQL bytecode. Whilst such an approach provides fast compilation into the byte code blocks, the execution can be slow as the interpreter carries out the actions specified in the byte code line by line. In an alternative approach, the execution plan may be compiled directly into machine code which can then be executed much more quickly by the processing system than byte code which requires the intermediate interpreter. However, compiling to machine code, so called code generation, takes more time than compiling into byte code and so whilst this route is usually faster overall, especially when processing large or complex queries, it can be slower to start returning results to the user, and may be slower overall for some queries. Therefore, a user may notice a perceptible delay in returning results using either approach.

The user query processing of FIG. 2 uses a modified approach for executing the execution plan 210 in which the operators are converted to bytecode 220 which is then compiled into unoptimized machine code and compiled into optimized machine code in parallel. Compiling the unopti-mized machine code is fast although can be slower to execute, whilst compiling the optimized machine code can be slower to compile but faster to execute. This approach provides an initial fast compiling of machine code which can then begin executing quickly. In parallel the optimized machine code is compiled and once completed, execution of the execution plan is switched from the unoptimized to the optimized machine code which further increases the speed of execution. Therefore, overall a user sees a fast start to the query processing with results beginning to be returned quickly, and also overall a rapid completion of the query processing.

The bytecode 220 may be any suitable bytecode such as Java or other formats such as memSQL. The bytecode may be structured to have a high-level sequence of instructions (Main) which calls individual functions (F1, F2) which may be each separately arranged to have respective sequences of bytecode instructions.

An unoptimized machine code compiling function 225 may be used to compile unoptimized machine code 235 corresponding to the bytecode 220 by replacing each portion of bytecode (e.g. an instruction) with a corresponding machine code portion (e.g. instruction). For example one Bytecode instruction comprising an opcode and arguments is compiled into one or more machine code instructions. The compiling function 225 may utilize a machine code look up table LUT 230 to retrieve portions of already compiled machine code to implement the bytecode instructions in machine code. For example, each bytecode instruction may be replaced with a corresponding machine code instruction (s). Simply replacing bytecode instructions with machine code instructions is fast as optimization processes that may normally be undertaken when compiling machine code are not employed at this stage. In some examples, some opti-mizations may be employed that have a low processing or compiling overhead such as inlining and register allocation.

The unoptimized machine code 235 may have a similar structure to the bytecode, having a high-level sequence of instructions (Main) which calls individual functions which may be each separately arranged to have respective sequences of machine code instructions. The unoptimized bytecode functions are illustrated in FIG. 2 as F1' and F2' to distinguish them from their corresponding bytecode func-tions F1 and F2.

The compiling function 225 may use tools such as ASMJIT (https://asmjit.com/) or other machine code librar-ies to compile the bytecode one instruction at a time into corresponding machine code instructions. However other compiling approaches could alternatively be employed such as using a compiler with a small number of lightweight (low processor overhead) optimizations.

The generating function 225 also includes adding a switching mechanism (omc?) 250 into the unoptimized machine code 235. The switching mechanism is configured to check if optimized machine code is available, and when it is, to switch to executing the query plan using the optimized machine code.

A compiler 240 may be used to compile the bytecode 220 into optimized machine code 245. The optimized machine code 245 may have a similar structure to the bytecode 220 and unoptimized machine code 235, having a high-level sequence of instructions (Main) which calls individual func-tions (F1", F2") which may be each separately arranged to have respective sequences of optimized machine code.

These different parts of the optimized machine code 245 will have associated memory locations or addresses which can be used by the switching mechanism 250 in the unop-timized machine code 235 to point to corresponding opti-mized machine code parts when these have completed compiling. For example, before executing the body of Main or F1 instruction sequences of the unoptimized machine code 235, the switching mechanism 250 checks if the optimized machine code 245 has completed compiling, and if it has, pointers to the locations of the respective Main and F1 instruction sequences of the optimized machine code 245 are used to continue execution of the execution plan using the optimized machine code 245 instead of continuing with the unoptimized machine code 235. This may be imple-mented by including the switching mechanism ocm? as the first instruction in Main or one or more of the functions of the unoptimized machine code 235. Then when these are called, the first instruction is to check whether the corre-sponding optimized machine code has completed compiling.

In some examples, the compiler 240 may merge or delete some of the functions from the bytecode 220 when compil-ing into optimized machine code 245—for example byte-code functions F1 and F2 may be combined into optimized machine code function F1", whilst retained separately in the unoptimized machine code as F1' and F2'. Another bytecode function F3 (not shown) may not be represented in the optimized machine code whilst being incorporated as func-tion F3' in the unoptimized machine code 235. In these cases, switching mechanisms 250 are deployed in the unop-timized machine code 235 at positions where it is possible to jump to a corresponding position in the optimized machine code. For example, a switching mechanism 250 may be provided before unoptimized machine code function F1' which can jump to corresponding optimized machine code function F1", but not before unoptimized machine code function F2' as there is no corresponding optimized machine code function F2". Depending on configuration, some portions of the bytecode 220 may be forced to have corresponding portions in the optimized machine code, for example Main.

FIG. 3 illustrates an example switching mechanism 250. Two pseudocode blocks 300 are shown to illustrate changes in the unoptimized machine code. The first block of pseudocode 310, corresponds to unoptimized machine code generated by the generator function 225 and includes a Main part which calls various functions, and an example Function X part. Each part comprises a number of machine code instructions, some of which are illustrated merely for illustrative purposes. Each part also includes a nop or "No Operation" which the processor ignores and moves onto the next instruction. This nop acts as a placeholder for a future pointer to the optimized machine code.

A separate thread checks for completion of compiling the optimized machine code. When this occurs, the thread finds the memory addresses for each portion of the unoptimized machine code, for example Main', F1', F2' etc, and replaces the nop instructions in the unoptimized machine code with jmp instructions (pointers or jump to instructions) to the start of respective optimized machine code parts (e.g. Main", F1", F2"). In this way, rather than the processor executing unoptimized machine code instructions, the processor execution jumps to the corresponding optimized machine code instructions. As the nop are only replaced once the optimized machine code has finished compiling, execution can continue using the unoptimized machine code until that point.

Figure 4:
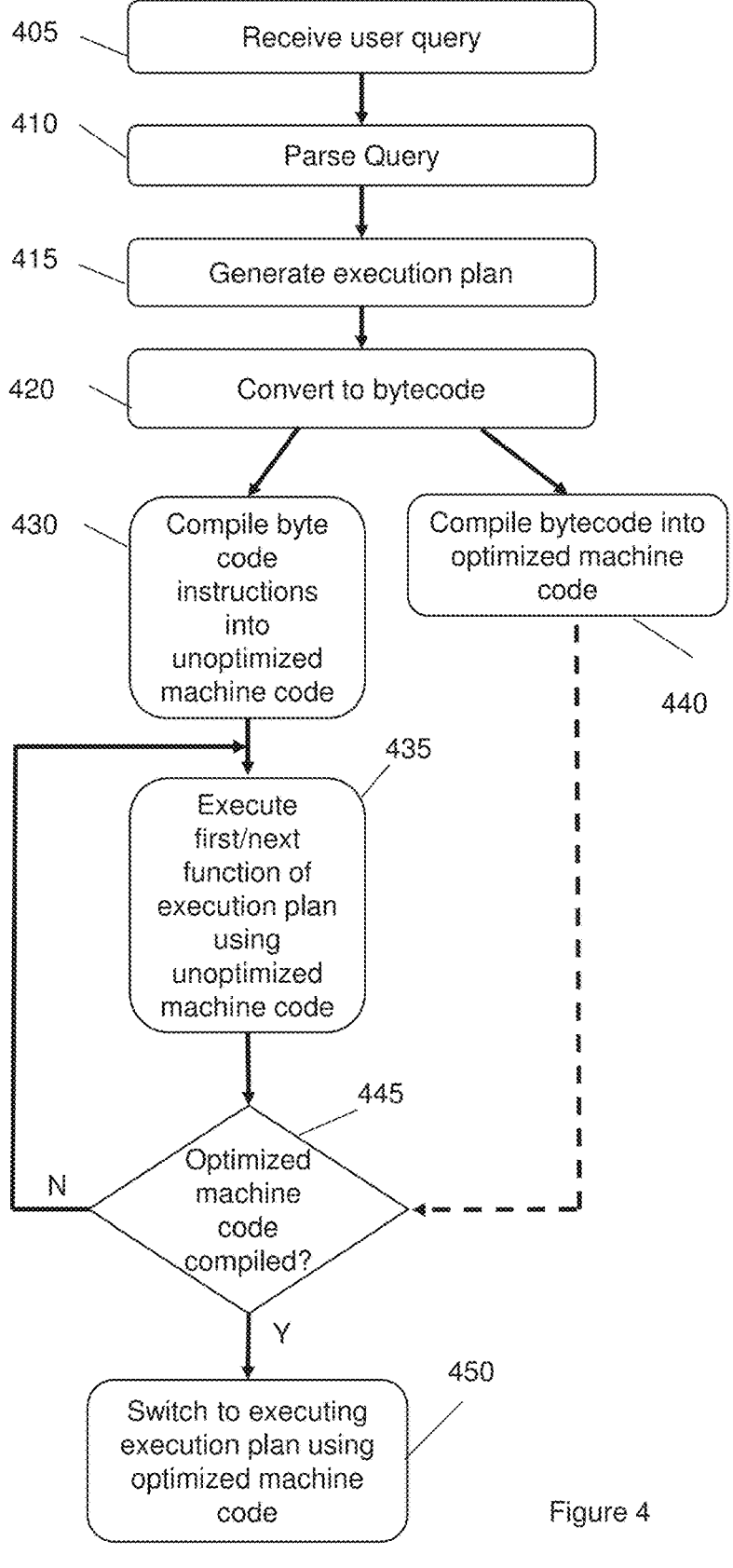
FIG. 4 is a flowchart of a method of processing a user query according to an example.

The optimized machine code 245 may be compiled from the byte code 220 directly or using a number of intermediate steps as described in more detail below. Various optimizations may be performed in order to make execution of the optimized machine code more efficient, faster, less resource intensive and to enable other performance enhancements. Some example optimizations that may be applied include: replacing some function calls with inline function instructions; loop unrolling; dead code elimination; and constant folding. Examples of LLVM optimizations may be found at https://llvm.org/does/Passes.html however optimizations from other compiler providers may additionally or alternatively be employed. Even if the unoptimized machine code were to employ some optimization in its compiling, the optimized machine code uses more optimizations in its compiling including those that may be processor intensive. In some examples, compiling the optimized machine code uses a first set of optimizations and compiling the unoptimized machine code uses a second set of optimizations. The first set of optimizations requires more processing resources such as processor cycles and memory usage. The second set of optimizations, for compiling the unoptimized machine code will be fast to implement but may provide significant runtime improvements. By contrast, the optimizations employed in compiling the optimized machine code may require multiple passes over the bytecode (and any intermediate representations) and may not scale linearly with the number of lines of bytecode. A method of executing an execution plan is shown in FIG. 4. This method 400 may be executed by the processor 120 of FIG. 1 to implement a query. The method 400, at 405, receives a user query, for example at user interface 150. At 410, the user query is parsed to determine the query shape and parameters.

At 415, an execution plan 210 is generated. The execution plan may be generated by any known process and comprises a number of operators 215. At 420, the method converts the execution plan 220 into bytecode 220, which includes sequences of bytecode instructions or opcodes. The bytecode 220 may be structured into a Main part and a number of function parts which the Main part calls. The various operators 215 of the execution plan may be implemented by calling a particular sequence of functions with appropriate argument parameters. An example function is a COMPARISON function, though there are many others.

At 430, the method compiles the bytecode into unoptimized machine code. The compiling may convert individual lines of bytecode or opcodes into corresponding machine code by looking up a suitable code reuse lookup table, such as an ASMJIT machine code library. Such an approach may not typically allow optimization of the machine code; however this type of compiling is fast to implement and quickly results in usable (unoptimized) machine code.

At 435, the method begins execution of the generated execution plan by executing the unoptimized machine code. This enables processing of the user query to begin quickly, before optimized machine code for the query has been compiled. Compiling machine code for new user queries is often the most time and resource intensive aspect of processing user queries and relying on this alone can result in noticeable delays for the user.

At 440, the method compiles optimized machine code. This may be implemented using a LLVM compiler although other compilers may alternatively be used such as GNU C compiler and green hills compiler for example. Compiling optimized machine code may follow the start of executing the unoptimized machine code, or compiling of the optimized machine code may start before this time and may run in parallel with compiling of the unoptimized machine code.

At 445, the method determines whether the optimized machine code has been compiled. This may be implemented using a separate thread which periodically checks for completion of the compiling job by the compiler, for example by setting a flag when the optimized machine code is compiled. The method may then simply check for the flag—this is illustrated with the dashed line.

At 450, one the optimized machine code has completed compiling, the method switches to executing the execution plan using the optimized machine code. This may be implemented using a switching mechanism in the unoptimized code which instructs a jump to the corresponding part of the optimized machine code as previously described. For example, jump instructions may be inserted into the unoptimized machine code, replacing nop instructions, so that when they are executed, execution jumps to corresponding parts of the optimized machine code. If the optimized machine code is still compiling, the method returns to 435 and continues executing the execution plan by executing unoptimized machine code.

The runtime of a new query is a combination of time to compile the query plan and the time to execute the compiled query plan. The above method significantly reduces runtime for new user queries as part of the query plan is already executed using the unoptimized machine code when the switch to optimized machine code occurs, thereby reducing overall speed of processing a user query. In addition, the method enables a fast start to this processing as the unoptimized machine code is fast to compile, so that query results start being returned quickly. It has been found that whilst this approach is slightly slower to compile the query plan than to convert to bytecode (~10%) it is approximately 2.5 times faster to execute than interpreting the bytecode, thus giving an approximate average 33% improvement in runtime for new queries.

Whilst in the above example, all of the bytecode is compiled into optimized machine code, in other examples, only some of the bytecode code may be compiled into optimized machine code. For example, some execution plan operators may involve significant processing resources whilst others may not. In some situations, it may therefore be decided to compile optimized machine code for resource intensive operators or functions such as "hotspot" functions that are likely to be called many times. Unoptimized machine code may be relied on for less resource intensive operators, such as functions that will only be called relatively infrequently. This may be configurable by a user depending on their preferences. In this example, where optimized machine code has been compiled, execution jumps from the unoptimized machine code part to the corresponding optimized machine code part, but then returns to the unoptimized machine code. In this way, execution of the execution plan switches between the compiled unoptimized machine code and the compiled optimized machine code. Overall, this is still faster than just using unoptimized machine code and quicker to start returning results than just using optimized machine code.

Figure 5:
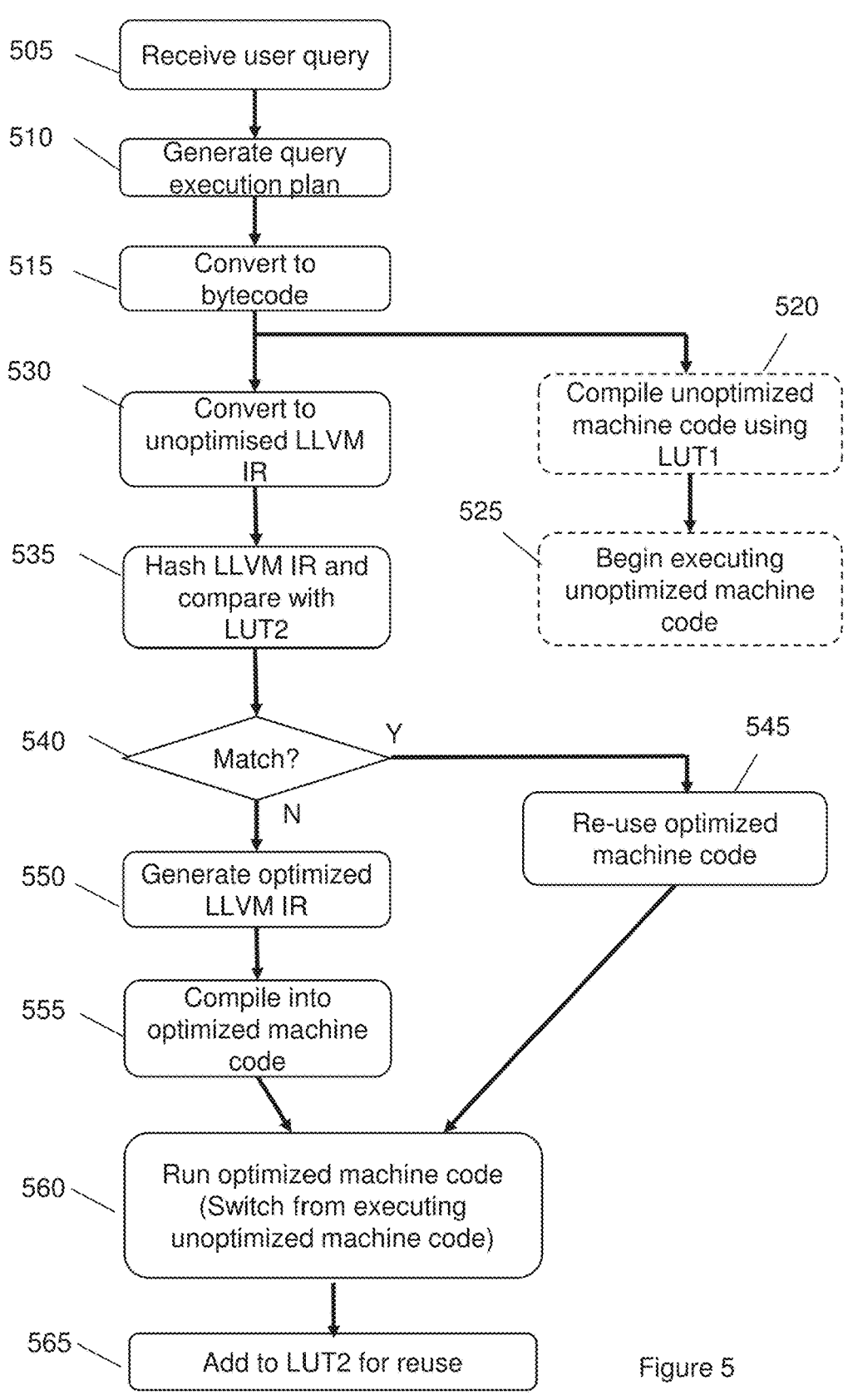
FIG. 5 is flowchart of a method of processing a user query according to an example.

FIG. 5 illustrates a method of processing user queries according to an example. This may be implemented by the processor 120 of FIG. 1. At 505, the method receives a user query such as a query to search a database 130. At 510, the method generates a corresponding query execution plan. At 515, the method converts the execution plan to corresponding bytecode. These processes may be as previously described. In some examples, the method may check for matching user queries which have already been compiled into machine code. Where a match is found, the compiled machine code may be reused. Where this is not the case, for example this is the first time the specific user query has been received, the method proceeds to the next steps.

At 520, the method optionally generates unoptimized machine code as previously described. For example, this may be implemented using a machine code reuse lookup table LUT1 which replaces bytecode parts with machine code parts, line-by-line. LUT1 may correspond to machine code lookup table 230 of FIG. 2. At 525, the method begins executing the unoptimized machine code. In alternative examples, these two processes 520, 525 are not implemented.

At 530, the method converts the bytecode into unoptimized LLVM IR. LLVM Intermediate Representation (IR) is a language independent intermediate representation of the bytecode. Intermediate representations (IR) are like text or pseudocode, and effectively explain what the intention of the code is. Many different source or bytecode languages can be converted to LLVM IR, and this can then be converted into many different types of machine code such as x86. LLVM is an opensource tool (https://llvm.org/) provided for manipulating and/or compiling various types of bytecode and source code into machine code. The bytecode may be converted into LLVM IR using LLVM libraries for example, though other converters and libraries may be employed.

At 535, the method hashes the LLVM IR and compares the resulting hash value with hash values stored in a machine code reuse lookup table LUT2. The LUT has hash values and paired precompiled optimized machine code. An example hashing function is md5sum( ) which has an output of 128 bits no matter how many input bits are used for the LLVM IR. However, other hash functions could alternatively be used.

The machine code reuse lookup table LUT2 may comprise already compiled optimized machine code corresponding to a number of different language independent intermediate representations. These may correspond to previously processed user queries that are the same as the current user query, or which have the same language independent intermediate representation. For example, user_query_x may have been previously processed into LLVM_IR_x and resulted in compiled machine code mc_x. When user_query_x is received again and is converted to LLVM_IR_x, LUT2 will contain corresponding precompiled machine code that can be reused. In another situation, the user query may be worded differently, user_query_y, but is essentially the same query and results in the same execution plan. In this case the execution plan will be converted to the same bytecode and the same language independent intermediate representation LLVM_IR_x. In this case the precompiled machine code mc_x and be used for user_query_y as well.

In another situation, when the underlying database management system (DBMS) software is upgraded, all existing query plans may be marked as stale as their precompiled machine code may in some circumstances no longer be compatible with the changed underlying code of the DBMS. However, in many cases the precompiled machine code may still work on the upgraded DBMS. In order to avoid redundant re-compilation of all the already compiled user queries, their language independent intermediate representations can be checked for matches. For example, prior to the DBMS upgrade, user_query_x results in a generated execution plan e_p_x which is converted into bytecode bc_x which in turn is converted into LLVM_IR_x. After the DBMS upgrade, the same user query user_query_x may result in a modified execution plan e_p_x' and/or modified bytecode bc_x' but this is ultimately converted into the same language independent intermediate representation LLVM_IR_x as this is a simpler pseudocode setting out the implementation of the user query. Because the language independent intermediate representation of the user query user_query_x is the same before and after the DBMS upgrade, its hash value will be the same and the precompiled machine code can be reused. In some circumstances, the language independent intermediate representations for a particular user query user_query_z will not match—LLVM_IR_z versus LLVM_IR_z'— in which case the user query will need to be recompiled. However, overall this approach reduces the amount of user query recompiling required. This approach saves time spent optimizing the intermediate representation and time spent compiling the optimized intermediate representation into optimized machine code.

At 540, the method checks whether the value of the hash of the LLVM IR matches a hash value in the lookup table. If there is a match, the method moves to 545, where the precompiled machine code corresponding to the matching hash value is reused. The method then moves to 560.

If there is no match at 540, the method moves to 550, where the method generates optimized LLVM IR. This may also occur if the lookup process fails and does not find stored already compiled machine code. Various optimizations may be performed by the LLVM tool and this may be determined in advance and then applied to all subsequence query processing. The optimizations may be selected based on the user, the query or other factors, or may be fixed for all users and queries. At 555, the method compiles the optimized LLVM IR into optimized machine code. Again, this function may be provided by the LLVM tool or a similar compiler provider. The LLVM IR optimization and compiling processes are computationally intensive however the number of times these processes are required is reduced by the above LLVM IR hash matching 540 and code reuse 545 processes.

At 560, the method executes the compiled optimized machine code. The optimized machine code may either be received from the reuse path 545, or the LLVM IR optimization and compiling path 550, 555. If unoptimized machine code has been generated and is already executing from 525, execution of the execution plan is switched to the optimized machine code as previously described.

At 565, the method adds the compiled optimized machine code to LUT2 for reuse for a matching LLVM IR. The compiled optimized machine code may also be stored for reuse for matching user queries.

The LUT2 or cache of precompiled machine code is persisted across upgrades to enable subsequent optimized machine code reuse when a user query LLVM IR hash value matches one stored in the cache.

The method enables reuse of machine code in situations where the query is equivalent but where the generated execution plan or bytecode is different. This may occur for example when the underlying software of the database management system is updated, resulting in some queries having a different query plan and/or bytecode. For these queries, the machine code needs to be updated as well, however this is expensive in terms of time and system resources. The method can avoid some of this recompiling by checking for matches at the LLVM IR level as this should be the same for the same queries, even if the execution plan or bytecode is different following a system upgrade. Therefore, the method reduces redundant compilation and as a consequence reduces query latency.

This approach can be further enhanced by configuring the bytecode converted from the query plans to call common helper functions rather than inlining the helper functions in the query plan bytecode. With common helper functions externed, the unoptimized LLVM IR will just contain a call to the helper function and not contain the body of the helper function. In this case the LLVM IR of the query will not be changed following an upgrade even if the upgrade affected the helper function. In other words, the hash value of the LLVM IR will be the same and so precompiled machine code can be reused.

This approach can also be used to warn database developers that changes in their database will invalidate already compiled machine code as the hash value for the resulting LLVM IR will no longer match anything contained in the lookup table.

The method of FIG. 5 may be used in combination with the method of FIG. 4, or they may be used independently.

Figure 6:
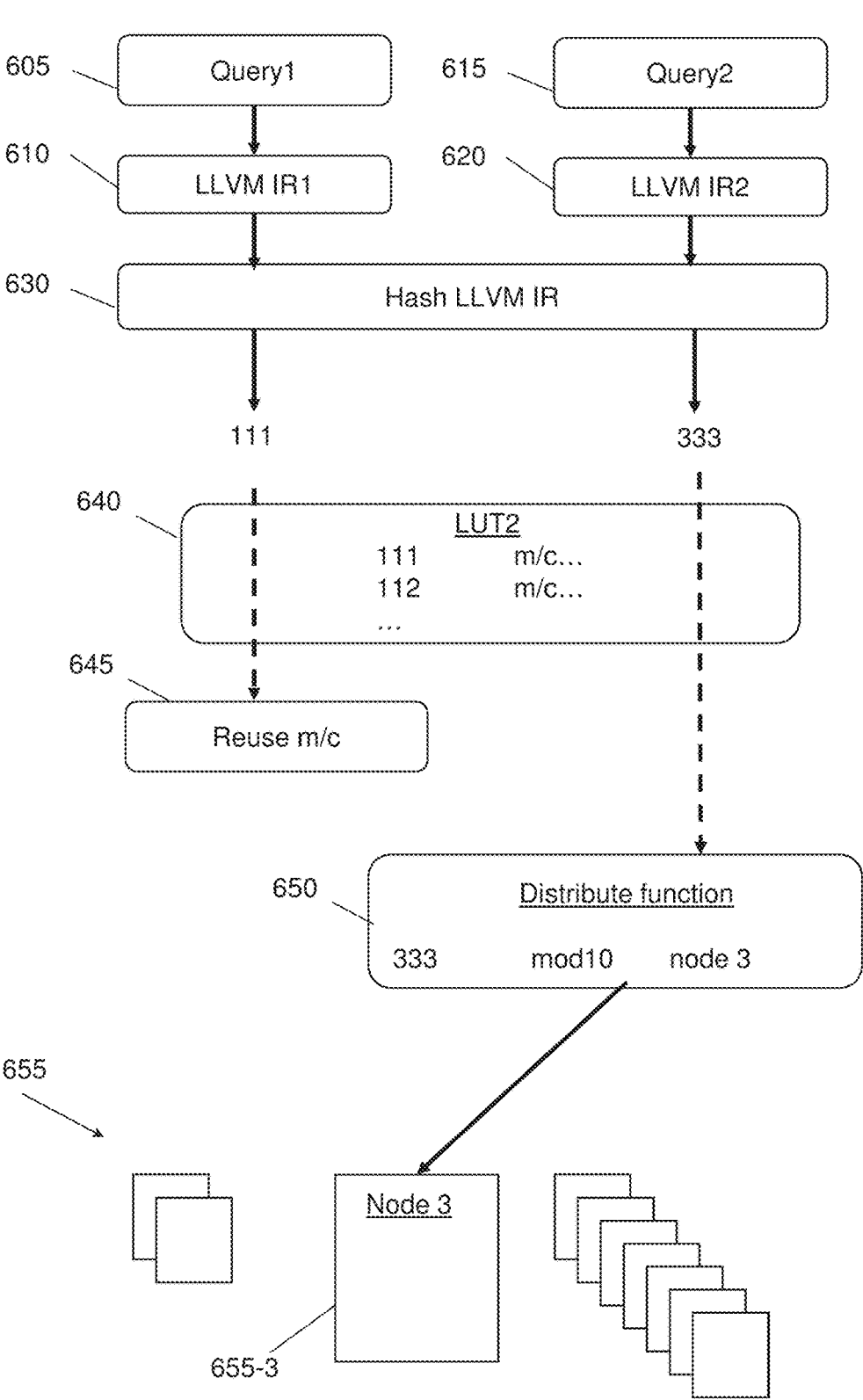
FIG. 6 is a schematic illustrating processing of a user query according to an example.

FIG. 6 illustrates the distribution of optimization and compiling amongst nodes of a node cluster. As previously noted, compiling, including optimizing, machine code requires considerable processor, memory and time resources. Distributing these tasks amongst the nodes avoids any one node becoming overloaded, which may impact on the performance of other user query processing, for example by causing query latency.

A database management system 600 is illustrated and comprises a plurality of nodes 655. Two user queries are illustrated, Query1 605 and Query2 615. Each query is converted into a language independent intermediate representation such as LLVM IR as previously described. Query1 is converted in LLVM IR1 610 and Query2 is converted into LLVM IR2 620. The system comprises a hashing function 630 which hashes each LLVM IR to generate respective hash values—for example 111 for LLVM IR1 and 333 for LLVM IR2. These particular hash values are shown simply for illustrative purposes.

Each hash value is checked against a lookup table LUT2 640. LUT2 comprises pairs of hash value—precompiled machine code. In the case of hash value 111, a corresponding precompiled machine code entry exists in LUT2 640. The machine code paired with hash value 111 can then be reused for Query1. The precompiled machine code reuse 645 may be implemented as described previously with respect to the method of FIG. 5, although other implementations are possible. In the case of hash value 333, there is no corresponding entry in the lookup table 640 and therefore the machine code for Query2 needs to be compiled. Again, this may be implemented as previously described with respect to the method of FIG. 5, although other implementations are possible The system 600 includes a distribute function 650 which distributes the task of compiling machine code for Query2 to one of the nodes of the node cluster. In this example, the node cluster comprises ten nodes 655 and the distribute function allocates the compiling to node 3 655-3 by using a modulo10 function on the hash value of the language independent intermediate representation LLVM IR2 for Query2. For example, mod 10(333)=3, corresponding to node 3 to which compiling of Query2 is allocated. The distribute function 650 then sends the unoptimized LLVM IR to node 3 for optimization and compiling. Upon completion, node 3 returns the optimized machine code for Query2, after adding this optimized machine code to its local LUT2 table.

The modulus of the distribute function may be varied according to the number of nodes in the cluster. In other examples, different mathematical functions may be used to assign compiling tasks to nodes within the cluster. The distribution function 650 may be arranged to evenly spread compilation overhead across the nodes in a deterministic manner so that the same LLVM IR is always sent to the same node for compilation (or checking for already compiled machine code). This occurs even when the number of nodes is changed.

The initial user query processing including generating the execution plan, converting to bytecode and converting to LLVM IR may be performed on a first node and the LLVM IR optimized and/or compiling to machine code may be performed on a second node within the cluster.

The distribute function also ensures that optimization/compiling of a particular LLVM IR is always sent to the same node. This means that if the LLVM IR has already been compiled and cached locally at that node, then it is readily available for reuse by that node. Similarly, because LLVM IR having the same hash value are sent to the same node, that node can quickly recover the precompiled machine code.

This means that if the same query is launched on different nodes, rather than each node compiling the query separately, the method allocates compilation of that query to one node according to the hash value and mathematical function so that already compiled machine code can be reused. This avoids duplicate compiling of the same user query which can happen often where users run the same query on different aggregator nodes. As optimization and compilation is time consuming and processor intensive, avoiding duplicate processing of this type reduces query latency and increases query throughput as additional processor resources are freed up.

Once the allocated node has compiled machine code for a user query, it may send this back to the node that received the user query so that the compiled machine code can be cached locally as well as at the allocated node performing the compiling.

The method avoids redundant compiling and also spreads out compilation workload across different nodes in a cluster. The hashing function allows the workload to be spread out evenly among all nodes as the distribution of output of the hash function is generally uniformly distributed. Therefore, no single node becomes overwhelmed with compilation work. Increasing the number of nodes in the cluster reduces the compilation work done by each node—for example expanding the number of nodes from 10 to 20 reduces the number of queries that each node has to compile by half.

The method of FIG. 6 may be used in combination with the methods of FIGS. 4 and/or 5, or independently of them.

In an aspect there is provided a computer implemented method comprising: generating an execution plan for a received user query; converting the execution plan into bytecode; converting the bytecode into a language-independent intermediate representation; determining that the language independent intermediate representation corresponds to previously compiled machine code and in response executing the previously compiled machine code to execute the execution plan.

In some embodiments, the language-independent intermediate representation is hashed to determine a hash value to compare with other hash values corresponding to pre-compiled machine code.

The language-independent intermediate representation is LLVM IR. The other hash values may be stored in a lookup table each having respective precompiled machine code. When there is no matching hash value, the LLVM IR is optimized and compiled into machine code which may be added to the lookup table together with the hash of the LLVM IR.

This aspect may be combined with the previously described method of generating unoptimized and optimized machine code in parallel and switching to the optimized machine code when this has finished compiling.

In another aspect there is provided a computer implemented method comprising: generating an execution plan for a received user query; converting the execution plan into bytecode; converting the bytecode into a language-independent intermediate representation; allocating compiling of machine code for the user query to a node of a cluster of nodes dependent on the user query.

In some embodiments, the method comprises compiling the machine code using the bytecode. The bytecode may be converted into a language-independent intermediate representation, for example LLVM IR, and which is compiled to obtain the machine code.

The allocation of compiling the machine code may be dependent on the language-independent intermediate representation. The allocation of compiling the machine code may be dependent on a hash value of the language-independent intermediate representation. The allocation of compiling the machine code may be dependent on a mathematical function applied to the hash value. The mathematical function may be modulo, with the modulus dependent on the number of nodes in the cluster.

Hash values of language-independent intermediate representations of different queries may be stored in a lookup table together with precompiled machine code for those queries.

At least some aspects of the examples described herein comprise computer processes performed in processing systems or processors. However, in some examples, this may extend to computer programs, particularly computer programs on or in a carrier, adapted for putting the examples into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method comprising:
   generating an execution plan for a received user query;
   converting the execution plan into bytecode;
   compiling the bytecode into an unoptimized machine code file and beginning execution of the unoptimized machine code file;
   converting the bytecode into a language-independent intermediate representation;
   determining that the language independent intermediate representation corresponds to a previously compiled machine code file; and
   in response to determining that the language independent intermediate representation corresponds to a previously compiled machine code file, switching to executing the previously compiled machine code file.

2. The computer-implemented method of claim 1, wherein the determining that the language independent intermediate representation corresponds to a previously compiled machine code file comprises hashing the language-independent intermediate representation to determine a hash value and comparing the hash value with one or more other hash values corresponding to one or more previously compiled machine code files.

3. The computer-implemented method of claim 1, comprising:
   generating another execution plan for another received user query;
   converting the other execution plan into bytecode;
   converting the bytecode into another language-independent intermediate representation;
   determining that the other language independent intermediate representation does not correspond to a previously compiled machine code file and in response compiling the other language independent intermediate representation into a machine code file.

4. The computer-implemented method of claim 3, wherein compiling the language independent intermediate representation into the machine code file comprises converting the other language-independent intermediate representation into an optimized language-independent intermediate representation and compiling the optimized language-independent intermediate representation into an optimized machine code file.

5. The computer-implemented method of claim 4, wherein compiling the language independent intermediate representation into the optimized machine code file comprises:

compiling the bytecode into an unoptimized machine code file and beginning execution of the execution plan by executing the unoptimized machine code file;

compiling the bytecode into the optimized machine code file whilst executing the unoptimized machine code file;

switching from executing the unoptimized machine code file to executing the optimized machine code file in order to execute the execution plan, when the optimized machine code file has been compiled.

6. The computer-implemented method of claim 5, wherein compiling the optimized machine code file uses processor and memory resources to implement a first set of optimizations and compiling the unoptimized machine code file uses processor and memory resources to implement a second set of optimizations, wherein the first set of optimizations uses more processor and memory resources than the second set of optimizations.

7. The computer-implemented method of claim 3, comprising hashing the other language-independent intermediate representation to determine a hash value and adding the determined hash value to a lookup table comprising other hash values of other language-independent intermediate representations corresponding to other previously compiled machine code files.

8. The computer-implemented method of claim 3, wherein the generating an execution plan for the received user query;

the converting the execution plan into bytecode;

the converting the bytecode into a language-independent intermediate representation; and the executing the previously compiled machine code file to execute the execution plan are performed on a first node;

and wherein the compiling the other language independent intermediate representation into machine code file is performed on a second node.

9. The computer-implemented method of claim 8, comprising selecting a node from a plurality of nodes as the second node, the selection dependent on the user query.

10. The computer-implemented method of claim 9, wherein the selecting a node comprises:

hashing the language-independent intermediate representation to calculate a hash value; and performing a mathematical function on the hash value in order to select the second node.

11. The computer-implemented method of claim 1, wherein the language-independent intermediate representation comprises LLVM IR (intermediate representation).

12. The computer-implemented method of claim 1, wherein the bytecode comprises a number of bytecode instructions, the unoptimized machine code file being compiled using a lookup table of precompiled machine code portions each corresponding to a bytecode instruction.

13. The computer-implemented method of claim 1, wherein the unoptimized machine code file comprises a number of functions, each function associated with a machine code check portion arranged to check for availability of the precompiled machine code file before calling the function.

14. The computer implemented method of claim 13, each function of the unoptimized machine code file having a no-operation instruction which is replaced with a jump instruction pointing to a corresponding function in the precompiled machine code file.

15. The computer-implemented method of claim 13, comprising invoking a jump instruction to the unoptimized machine code file in response to determining that the language independent intermediate representation corresponds to the previously compiled machine code file, the jump instruction pointing to the previously compiled machine code file.

16. A database system for executing a query on data stored in the database system, the database system comprising:

one or more hardware processors;

storage comprising computer-executable instructions which, when executed by the one or more processors, cause the database system to:

generate an execution plan for a received user query;

convert the execution plan into bytecode;

compile the bytecode into an unoptimized machine code file and beginning execution of the unoptimized machine code file;

convert the bytecode into a language-independent intermediate representation;

determine that the language independent intermediate representation corresponds to previously compiled machine code file; and in response to a determination, by the database system, that the language independent intermediate representation corresponds to a previously compiled machine code file, switch to executing the previously compiled machine code file.

17. A non-transitory computer-readable storage medium comprising computer-executable instructions which, when executed by one or more processors, cause the one or more processors to:

generate an execution plan for a received user query;

convert the execution plan into bytecode;

compile the bytecode into an unoptimized machine code file and beginning execution of the unoptimized machine code file;

convert the bytecode into a language-independent intermediate representation;

determine that the language independent intermediate representation corresponds to previously compiled machine code file; and in response to a determination, by the one or more processors, that the language independent intermediate representation corresponds to a previously compiled machine code file, switch to executing the previously compiled machine code file.

* * * * *